United States Patent [19]

Hong

[11] Patent Number: 5,766,799

[45] Date of Patent: *Jun. 16, 1998

[54] METHOD TO REDUCE THE INTERNAL PRESSURE OF A SEALED RECHARGEABLE HYDRIDE BATTERY

[76] Inventor: Kuochih Hong, 1790 Rollingwoods, Troy, Mich. 48098

[ * ] Notice: The term of this patent shall not extend beyond the expiration date of Pat. No. 5,733,680.

[21] Appl. No.: 789,947

[22] Filed: Jan. 27, 1997

Related U.S. Application Data

[63] Continuation-in-part of Ser. No. 212,354, Mar. 14, 1994, Pat. No. 5,541,017, and a continuation-in-part of Ser. No. 553,756, Oct. 23, 1995.

[51] Int. Cl.$^6$ ............................................. H01M 2/04
[52] U.S. Cl. ........................ 429/218; 429/219; 429/220; 429/223; 429/224; 420/900; 29/623.5
[58] Field of Search ......................... 429/59, 101, 218, 429/219, 220, 223, 224; 420/455, 900; 29/623.1, 623.5; 423/644

[56] References Cited

U.S. PATENT DOCUMENTS 5,541,017  7/1996  Hong ............................................ 429/59

Primary Examiner—M. Nuzzolillo

[57] ABSTRACT

This invention provides a method to reduce the internal pressure of a hydride battery, particularly a sealed type. The battery, according to this invention, is composed of a container, a positive electrode, a negative electrode suitable for various temperatures comprising at least two hydrogen storage electrode materials and/or their hydrides, a separator positioned between the positive and negative electrodes, and an electrolyte in the container and in contact with the positive and negative electrodes and the separator. The negative electrode is a hydrogen storage hydride electrode which is composed of at least two hydrogen storage electrode alloys having compositions represented by $A_a B_b C_c \ldots$ and $A'_a B'_b C'_c \ldots$ respectively; where the set of elements: A, B, C, ... and the set of elements: A', B', C', ... both consist of 6 to 80 at. % of nickel, preferably 24–55 at. % nickel; and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, Ca, rare earth metals, B, Hf, Sc, Zn, Sb, W, Sn, N, O, Ge, Ga, the alkali metals, P, and S; the sets of atomic mole ratio a, b, c, ... and a', b', c', ... are defined by the heats of hydride formation $H_h$ and $H'_h$ respectively; where $H_h$ and $H'_h$ are in a range of between −2.50 and −10.50 Kcal/mole H, preferably between −3.50 and −8.50 Keal/mole H; and at least one of the compositions consists of more than 40 at. % of nickel, preferably more than 47 at. % of nickel; and at least one of the heats of hydride formation of the alloys is in the range between −7.50 and −2.50 Kcal/mole H, preferably between −7.08 and −2.80 Kcal/mole H.

21 Claims, No Drawings

METHOD TO REDUCE THE INTERNAL PRESSURE OF A SEALED RECHARGEABLE HYDRIDE BATTERY

CROSS-REFERENCE TO RELATED APPLICATIONS

This application is a continuation in part application of application U.S. Pat. application Ser. No. 08/212,354 filed on 03/14/94, now U.S. Pat. No. 5,541,017, and Ser. No. 08/553,756 filed on Oct. 23, 1995, which is pending.

BACKGROUND OF THE INVENTION

1. Field of the Invention

This invention relates to a method to reduce the internal pressure of a sealed rechargeable hydride battery. More specifically, this invention relates to a method to make rechargeable hydride electrodes and sealed batteries having low internal pressure during overcharge at high rates.

2. The Related Art

There are numerous researchers reporting hydrogen storage electrode materials for electrochemical applications. These researchers include Sapru et. al. in U.S. Pat. No. 4,551,400, Rechman et al. in U.S. Pat. No. 4,716,088, Venkatesan et al. in U.S. Pat. No. 4,728,586, Hong in U.S. Pat. Nos. 4,849,205 and 5,006,328, Fetcenko et al. in U.S. Pat. Nos. 5,096,667, 5,104,617 and 5,238,756, Gamo et al in U.S. Pat. No. 4,946,646. All these prior arts only teach the use of a single hydrogen storage material for a hydride electrode or for a hydride batter. As a result, the battery made often has a high internal pressure due to a poor oxygen recombination rate and a high self discharge rate due to the high volume expansion causing micro-shorting. Therefore, the battery made can not be charged at a higher rate and the cycle life is short.

In the hydrogen storage hydride technology, there are many hydrogen storage materials given in the prior arts that have a high hydrogen storage capacity. However, these materials generally are very sensitive to the attack of oxygen. Therefore, they form a surface oxide layer and thus a poor hydrogen absorption rate in the hydrogen/oxygen environment. Consequently, the hydride electrode made will be damaged during overcharge and the sealed cell made will have a high internal pressure, especially at high-rate charge-discharge cycles.

To solve these problems, the present invention provides, through the application of thermodynamics, Kinetics and electrochemistry, a method of selecting multicomponent alloys to make a rechargeable hydrogen storage electrode than reduces the internal pressure of the sealed hydride battery, made.

SUMMARY OF THE INVENTION

This invention provides a method to reduce the internal pressure of a sealed hydride battery.

The battery, according to this invention, is composed of a container, a positive electrode, a negative electrode comprising of at least two hydrogen storage electrode materials and/or their hydrides, a separator positioned between the positive and negative electrodes, and an electrolyte in the container and in contact with the positive and negative electrodes and the separator. The positive electrode is composed of metal oxide(s) as the active material, preferably nickel oxide(s). The separator is composed of a body selected from nylon, polypropylene, polysulfone or combinations thereof The electrolyte is composed of an alkaline solution. The container is made of either metal or plastic materials. The negative electrode is a hydrogen storage hydride electrode which is composed of at least two hydrogen storage electrode alloys having compositions represented by $A_a B_b C_c \ldots$ and $A'_a B'_b C'_c \ldots$ respectively;

where the set of elements: A, B, C, ... and the set of elements: A', B', C', ..... both include nickel and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, Ca, rare earth metals, B, Hf, Sc, Zn, Sb, W, Sn, N, O, Ge, Ga, the alkali metals, P, and S; the sets of atomic mole ratio a, b, c, ... and a', b', c', ... are defined by the heat of hydride formation given below; though it is not necessary, it is desirable to normalize the sum of the atomic mole ratios: $a+b+c+\ldots$ and $a'+b'+c'+\ldots$ to be equal to 1;

where the compositions represented by $A_a B_b C_c \ldots$ and $A'_a B'_b C'_c \ldots$ consist of 6 to 80 at. % of nickel; and at least one of the compositions consists of more than 40 at. %, preferably more than 47 at. % of nickel;

where the aforementioned hydrogen storage electrode alloys having compositions represented by $A_a B_b C_c \ldots$ and $A'_a B'_b C'_c \ldots$ have the heats of hydride formation $H_h$ and $H'_h$, respectively; where $H_h$ and $H'_h$ are in a range of between $-2.50$ and $-10.50$ Kcal/mole H, preferably between $-3.50$ and $-8.50$ Kcal/mole H; where at least one of the heats of hydride formation $H_h$ and $H'_h$ of the alloys, $A_a B_b C_c \ldots$ and $A'_a B'_b C'_c \ldots$ are between $-7.50$ and $-2.50$ Kcal/mole H, preferably between $-7.08$ and $-2.80$ Kcal/mole H; and where the heats of hydride formation; $H_h$ and $H'_h$ are defined by;

$$H_h = (a\,H_h(A) + b\,H_h(B) + c\,H_h(C) + \ldots)/(a+b+c+\ldots) + K \quad (1)$$

$$H'_h = (a'H_h(A') + b'H_h(B') + c'H_h(C') + \ldots)/(a'+b'+c'+\ldots) + K' \quad (2)$$

where $H_h(A)$, $H_h(B)$, $H_h(C)$, ... are the heats of hydride formation of the elements A, B, C, ..... in units of Kcal/mole H, respectively; and where $H_h(A')$, $H_h(B')$, $H_h(C')$, ... are the heats of hydride formation of the elements A', B', C', ... in units of Kcal/mole H, respectively, where the heat of hydride formation of the elements in units of Kcal/mole H, is given as; $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=3.5$, $H_h(Ni)=1.8$, $H_h(Al)=-1.38$, $H_h(Y)=-27$, $H_h(Zr)=-19.5$, $H_h(Nb)=-9.0$, $H_h(Pd)=-4.0$, $H_h(Mo)=-1.0$, $H_h(Ca)=-21.0$, $H_h(Si)=-1.0$, $H_h(Cu)=2.0$, $H_h(Ta)=-10.0$, $H_h$(rare earth metals)$=-27$, $H_h(Li)=-21.0$, $H_h(Na)=-13.4$, $H_h(K)=-13.7$, $H_h(Rb)=-12.5$, $H_h(B)=2.83$, $H_h(Sn)=2.05$, $H_h(Sb)=5.5$, $H_h(Hf)=-20.2$, $H_h(Sc)=-28.9$, $H_h(Zn)=-1.2$, $H_h(Ag)=1.0$, $H_h(S)=-1.0$, $H_h(N)=-0.5$, $H_h(W)=-0.50$, and $H_h(P)=-0.30$; where K is a constant having values of 0.5, $-0.2$, and $-1.5$ Kcal/mole H for $a+b+c+\ldots$ equal to 2, 3, and 6 respectively, and having the value zero for $a+b+c+\ldots$ not equal to 2, 3 and 6; and where K' is a constant having values of 0.5, $-0.2$, and $-1.5$ Kcal/mole H for $a'+b'+c'+\ldots$ equal to 2, 3, and 6 respectively, and having the value zero for $a'+b'+c'+\ldots$ not equal to 2, 3 and 6.

The two or more hydrogen storage electrode materials having compositions represented by $A_a B_b C_c \ldots$ and $A'_a B'_b C'_c \ldots$ can be single phase or multiphase, and can be selected from the $AB_x$-, $AB_2$-, $AB_5$-type alloy(s) and/or combinations thereof Also, the portion of each one of the hydrogen storage electrode materials is between 2 wt. % and 98 wt. % of the total of the hydrogen storage electrode materials, preferably , between 20 wt. % and 80 wt. %. Further preferably, the portion of each one of the hydrogen storage electrode materials is equal.

wherein the method further includes the steps of; (1) preparing the ingots of said materials; (2) preparing the powder of said materials; (3) mixing the powder particles of said materials; and (3) impregnating the powder mixture into a substrate current collector to make said hydride negative electrode.

It is the major objective of the present invention to provide a hydride battery, especially a sealed type, using the aforementioned improved hydrogen storage hydride electrode as the negative electrode, wherein as a consequence, the battery so made has a low internal pressure during overcharge at high rate charge-discharge cycles.

The advantages, features, and other objects of the present invention will become clear from the following detailed description.

DETAILED DESCRIPTION OF THE INVENTION

It is the major objective of the present invention to provide a method to reduce the internal pressure of a sealed hydride battery. The major objective of the present invention is to provide a sealed type hydride battery suitable for high rate charge and overcharge. In a nickel-hydride battery, the electrochemical reactions are as follows;

At the positive electrode (Nickel electrode);

$$Ni(OH)_2 + OH^- \xrightleftharpoons[\text{discharge}]{\text{charge}} NiOOH + H_2O + e^- \quad (3)$$

At the negative electrode (hydride electrode):

$$M + xH_2O + xe^- \xrightleftharpoons[\text{discharge}]{\text{charge}} MH_x + xOH^- \quad (4)$$

where M and $MH_x$ are the hydrogen storage material and its hydride, respectively. The hydride in Equ. (4) is related to hndrogen equilibrium pressure shown in Eq. (5):

$$MH_x = M + x/2H_2 \quad (5)$$

The hydrogen equilibrium pressure, $P(H_2)$, of the hydride former M at a given H/M composition depends on the temperature T given in Eq. (6):

$$\ln P(H_2) = H_h/RT + S_h/R \quad (6)$$

where $H_h$ and $S_h$ are the heat and entropy of hydride formation of M respectively, and R is the gas constant.

During charging, as shown in Equations 3 and 4, hydroxide ions pass through the separator via the electrolyte from the negative electrode to the positive electrode, and water molecules pass through the separator via the electrolyte from the positive electrode to the negative electrode. During discharge, wherein a load is placed across the positive and negative terminals, water molecules pass through the separator, via the electrolyte, from the negative electrode to the positive electrode, and hydroxide ions pass through the separator via the electrolyte, from the positive electrode to the negative electrode.

During overcharge, water electrolysis will occur. Thus, oxygen will be generated at the positive electrode and hydrogen gas will be generated at the negative electrode. During overdischarge, water electrolysis will also occur. Thus, hydrogen gas will be generated at the positive electrode and oxygen will be generated at the negative electrode. For a positive limited hydride cell, the electrochemical reactions can be expressed as the following equations;

OVERCHARGE ( positive limited cell)

At positive electrode:

$$yOH^- \rightarrow y/2H_2O + y/4O_2 + ye^- \quad (7)$$

At negative electrode:

$$MH_x + yH_2O + ye^- \rightarrow MH_{x+y} + yOH^- \quad (8a)$$

(ideal case)

$$y/4O_2 + MH_{x+y} \rightarrow MH_x + y/2H_2O \quad (8b)$$

(general case)

$$z/2O_2 + MH_{x+y} \rightarrow MH_{x+y-2z}O^z + zH_2 \quad (8c)$$

OVERDISCHARGE (negative precharged cell)

At positive electrode:

$$m\ H_2O + me^- \rightarrow m\ OH^- + m/2H_2 \quad (9)$$

At negative electrode:

$$MH_q + mOH^- \rightarrow MH_{q-m} + mH_2O + me^- \quad (10a)$$

$$MH_{q-m} + m/2H_2 \rightarrow MH_q \quad (10b)$$

During overcharge, in a sealed cell, if the oxngen gas does not recombine with hydrogen (Equ. 8b) or the recombination rate is poor, the internal pressure will increase and vent out through the safety valve. The electrolyte will then be lost and cell life is consequently shortened. Other factors, such as poor charging efficiency, will also increase the internal pressure of the cell.

A low internal pressure at high rate charge/discharge cycles and long life hydride battery, according to this invention, is composed of a container, a positive electrode, a negative electrode, a separator positioned between the positive and negative electrodes, and electrolyte in the container and in contact with the positive and negative electrodes and the separator. The negative electrode is a hydrogen storage electrode, which is composed of at least one hydrogen storage material and/or its hydride.

According to this invention, the negative electrode is a hydrogen storage hydride electrode which is composed of at least two hydrogen storage electrode materials having compositions represented by $A_aB_bC_c$... and $A'_{a'}B'_{b'}C'_{c'}$... respectively; where the set of elements: A, B, C, ... and the set of elements; A', B', C', ..... both include nickel and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, rare earth metals, B, Hf, Sc, Zn, Sb, W, Sn, N, O, Te, Ge, Ga, the alkali metals, P, and S; the sets of atomic mole ratio a, b, c, ... and a', b', c', ... are defined by the heat of hydride formation given below; though it is not necessan', it is desirable to normalize the sum of the atomic mole ratios; a+b+c+... and a'+b'+c'+... to be equal to 1;

where the compositions represented by, $A_aB_bC_c$... and $A'_{a'}B'_{b'}C'_{c'}$.... consist of 6 to 80 at. % of Nickel; and at least one of the compositions consists of more than 40 at. % of nickel, preferably more than 47 at. % of nickel.

where the aforementioned hydrogen storage electrode materials having compositions represented by $A_aB_bC_c$... and $A'_{a'}B'_{b'}C'_{c'}$.... having the heats of hydride formation $H_h$ and $H'_h$ respectively; where $H_h$ and $H'_h$ are in a range of between −2.50 and −10.50 Kcal/mole H, preferably between −3.50 and −8.50 Kcal/mole H; where at least one of the heats of hydride formation $H_h$ and $H'_h$ of the alloys, $A_aB_{b'}C_{c'}$... and $A'_{a'}B'_{b'}C'_{c'}$.... being in the range between −7.50 and −2.50 Kcal/mole H, preferably between −7.08 and −2.80

Kcal/mole H; and where the heats of hydride formation; $H_h$ and $H'_h$ are defined by;

$$H_h=(aH_h(A)+bH_h(B)+cH_h(C)+\ldots)/(a+b+c+\ldots)+K \quad (1)$$

$$H'_h=(a'H_h(A')+b'H_h(B')+c'H_h(C')+\ldots)/(a'+b'+c'+\ldots)+K'. \quad (2)$$

where $H_h(A)$, $H_h(B)$, $H_h(C)$, ... are the heats of hydride formation of the elements A, B, C, ..., in units of Kcal/mole H, respectively and where $H_h(A')$, $H_h(B')$, $H_h(C')$, ... are the heats of hydride formation of the elements A', B', C', ..., in units of Kcal/mole H, respectively; where the heats of hydride formation of the elements A, B, C, ..., in units of Kcal/mole H, are given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=-4.0$, $H_h(Co)=-3.5$, $H_h(Ni)=-1.8$, $H_{h(Al)}=-1.38$, $H_h(Y)=-27$, $H_h(Zr)=-19.5$, $H_h(Nb)=-9.0$, $H_h(Pd)=-4.0$, $H_{h(Mo)}=-1.0$, $H_h(Ca)=-21.0$, $H_h(Si)=-1.0$, $H_h(C)=-1.0$, $H_h(Cu)=-2.0$, $H_h(Ta)=-10.0$, $H_h$(rare earth metals)$=-27.0$, $H_h(Li)=-21.0$, $H_h(Na)=-13.4$, $H_h(K)=-13.7$, $H_h(Rb)=-12.5$, $H_h(B)=2.83$, $H_h(Sn)=2.05$, $H_h(Sb)=5.5$, $H_h(Hf)=-20.2$, $H_h(Sc)=-28.9$, $H_h(Zn)=-1.2$, $H_h(Ag)=1.0$ $H_h(S)=-1.0$, $H_h(N)=-0.5$, $H_h(W)=-0.50$, and $H_h(P)=-0.30$; where K is a constant having values of 0.5, $-0.2$, and $-1.5$ Kcal/mole H for $a+b+c+\ldots$ equal to 2, 3, and 6 respectively, and having the value zero for $a+b+c+\ldots$ not equal to 2, 3 and 6; and where K' is a constant having values of 0.5, $-0.2$, and $-1.5$ Kcal/mole H for $a'+b'+c'+\ldots$ equal to 2, 3, and 6 respectively, and having the value zero for $a'+b'+c'+\ldots$ not equal to 2, 3 and 6.

The two hydrogen storage electrode materials having compositions represented by $A_aB_bC_c\ldots$ and $A'_aB'_bC'_c\ldots$ can be single phase or multiphase, and can be selected from the $AB_x$-, $AB_2$-, $AB_5$-type alloy(s) and/or combinations thereof. Also, the portion of each one of the hydrogen storage electrode materials is between 2 wt. % and 98 wt. % of the total of the hydrogen storage electrode materials, preferably, between 20 wt. % and 80 wt. %. Further preferably, the portion of each one of the hydrogen storage electrode materials is equal.

For a hydride electrode consisting of three, four or more hydrogen storage materials, the method used is similar to that mentioned above.

In a hydrogen storage material, the heat of hydride formation governs the stability of the hydride formed. The more negative the heat of hydride formation is, the more stable and therefore the lower the equilibrium hydrogen pressure of a hydride former will be. If the heats of hydride formation of the two or more hydrogen storage electrode materials are all more negative than $-7.50$ Kacl/mole H, the materials are all vecr sensitive to oxygen and therefore, the electrode made will not have good kinetics for hydrogen absorption during overcharge and the sealed cell made will have a high internal pressure. If the heats of hydride formation of the two or more hydrogen storage electrode materials are all less negative than $-2.50$ Kcal/mole H, the materials are all too unstable to store hydrogen. According to this invention, it is obvious that a useful hydrogen storage electrode alloy must consist of at least an element having the heat of hydride formation more negative than $-2.50$ Kcal/mole H, and that the alloy can not contain the elements having the heats of hydride formation more negative than $-10.50$ Kcal/mole H. Furthermore, a hydrogen storage electrode consisting of one or more hydrogen storage materials having compositions consisting of more than 40 at. %, preferably more than 47 at. % of nickel, will be less sensitive to oxygen and be a good electrocatalyst. Therefore, the electrode will have good kinetics for hydrogen absorption and have a better oxygen recombination rate during overcharge. Consequently, the sealed cell made will have low internal pressure.

The battery, according to this invention, is composed of a container, a positive electrode, a hydride negative electrode comprising a body of rechargeable hydrogen storage active material and/or the hydride thereof, a separator positioned between the positive and negative electrodes, and electrolyte in the container and in contact with the positive and negative electrodes and the separator. According to this invention, a hydride negative electrode is composed of at least two or more hydrogen storage electrode alloys, single phase or multiphase, selected from the group of the $AB_x$-, $AB_2$-, $AB_5$-type alloy(s) and/or combinations thereof. Some of the $AB_x$-type multicomponent alloys are disclosed by Gamo et. al. in U.S. Pat. No. 4,946,646, and Hong in U.S. Pat. Nos. 4,849,205, 5,006,328, 5,501,917, 5,541,017, 5,552,246, and 5,556,719, such as the five— or more—element materials selected from a group represented by the following formula;

$A_aB_bNi_cD_yM_xR_z$ and the hydrides thereof; where Ni is the element nickel and the other components A, B, D, M and R are defined by: A is at least one element selected from the group consisting of: Ti, Zr and Hf; B is at least one element selected from the group consisting of Al, V, Mn, Nb, Si, Pd and Ag; D is at least one element selected from the group consisting of: Cr, Mn, Fe, Co, Cu, Zn, Mo, W and Sn; R is at least one element selected from the group consisting of; C, B, Ca, Bi, Sb, Y, Sc, Hf, Ta, N, O, Te, Ge, Ga and Mm, where Mm is mischmetal; M is at least one element selected from the group consisting of Li, Na, K, Rb, Cs, Mg, P and S; and where the atomic mole ratios: a, b, c, x, y and z are defined by: $0.10<a<0.85$, $0.01<b<0.65$, $0.02<c<0.75$, $0<y<0.30$, $0\leq x<0.15$, $0\leq z<0.30$, $a+b+c+x+y+z=1.00$, and preferably, the atomic mole ratio of Ti is not greater than a, but is greater than zero; $0.4<a<0.65$, $0.02<b<0.40$, $0.10<c<0.45$, $0\leq x<0.15$, $0<y<0.15$, $0\leq z<0.15$; also preferably, Zr is less than 30 at. %, if present. Also, at least one of the compositions consisting of more than 40 at. % of nickel, preferably more than 47 at. % of nickel; and where the aforementioned two hydrogen storage electrode materials selected have the heats of hydride formation in a range of between $-2.50$ and $-10.50$ Kacl/mole H, preferably between $-3.50$ and $-8.50$ Kcal/mole H; and at least one of the heats of hydride formation of the alloys, is in the range between $-7.50$ and $-2.50$ Kcal/mole H, preferably between $-7.08$ and $-2.80$ Kcal/mole H. Also, the portion of each one of the hydrogen storage electrode materials is between 2 wt. % and 98 at % of the total of the hydrogen storage electrode materials; preferably, between 20 wt. % and 80 wt. %. Further preferably, the portion of each one of the hydrogen storage electrode materials is equal.

Alternatively, the negative electrode is composed of at least two hydrogen storage alloys, single phase or multiphase, selected from a group represented by the following formula:

$A_aB_bNi_cD_yQ_pM_xR_z$ and its hydride thereof;

where Ni is the element nickel and other components, A, B, D, Q, M and R are defined by: A is at least one element selected from the group consisting of; Ti, Zr, and Hf; B is at least one element selected from the group consisting of; V, Mn, and Cr; D is Al and/or Si; Q is at least one element selected from the group consisting of, Fe, Co, Cu, Zn, Nb, Mo, W, Pd, Ag and Sn; R is at least one element selected from the group consisting of C, B, Ca, Sb, Bi, Sc, Y, Hf, Ta, N, O, Te, Ge, Ga and Mm, where Mm is mischmetal; M is at least one element selected from the group consisting of Li, Na, K, Rb, Cs, Mg, P and S; where the atomic mole ratios, a, b, c, y, p, x and z are defined by: $0.10\leq a\leq 0.85$, $0.01 \leq b \leq 0.65$, $0.02 \leq c \leq 0.75$, $0 \leq y \leq 0.30$, $0 \leq p \leq 0.30$, $0 \leq x \leq 0.15$, $0 \leq z \leq 0.30$, and $a+b+c+x+y+z+p=1.00$, the atomic mole ratio of Ti is not greater than a, but is greater than zero; and if present, Mm is 0–8.0 at. %. O is 0–2.0 at. % and Mn is 0–15 at. %, and Al is between 3.0 and 30 at. %; preferably $0.40<a<0.65$, $0.02<b<0.40$, $0.10<c<0.45$, $0<y<0.15$, $0<p<0.15$, $0<x<0.15$, $0<z<0.15$; another preferably, $0.20<a<0.65$, $0.10<b+c<0.30$, $0<y<0.15$, $0<p<0.15$, $0<x<0.15$, $0<z<0.15$; futher preferably, Zr is less than 30 at. % and/or $0.07<p+z$, and where the aforementioned two hydrogen storage electrode materials selected have the heats of hydride formation in a range of between −2.50 and −10.50 Kcal/mole H, preferably between −3.50 and −8.50 Kcal/mole H; and at least one of the hydrogen storage materials has a composition consisting of more than 40 at. % of nickel, preferably more than 47 at. % of nickel, and at least one of the heats of hydride formation of the alloys, is in the range between −7.50 and 31 2.50 Kcal/mole H, preferably between −7.08 and −2.80 Kcal/mole H. Also, the portion of each one of the hydrogen storage electrode materials is between 2 wt. % and 98 wt. % of the total of the hy,drogen storage electrode materials, preferably, between 20 wt. % and 8 wt. %. Further preferably, the portion of each one of the hydrogen storage electrode materials is equal.

Specifically, the negative electrode is composed of at least two hydrogen storage materials, which consist of five or more elements. At least one of the materials is selected from a group having compositions represented by:

$E_a G_b Ni_c D_y M_x R_z$, and at least one of the materials is selected from a group having compositions represented by:

$Ln_{1-p} A_p Ni_{5-q} B_q$, where $E_a G_b Ni_c D_y M_x R_z$ is $AB_x$ or $AB_2$-alloy(s) and can be single phase or multiphase, Ni is the element nickel and other components, E, G, D, M and R are defined by: E is one or more elements selected from the group consisting of; Ti, Zr, Hf, Ca, and rare earth metals; G is at least one element selected from the group consisting of; Al, V, Mn, Nb, Hf, Ta, Si, Pd and Ag; D is at least one element selected from the group consisting of; Cr, Mn, Fe, Co, Cu, Zn, Mo, W and Sn; R is at least one element selected from the group consisting of; C, B, Mg, Al, Sb, Bi, Sc, Y, Hf, Ta, N, O, Te, Ge, and Ga; M is at least one element selected from the group consisting of Li, Na, K, Rb, Cs, P, and S; where a, b, c, x, y and z are defined by; $0.10 \leq a<0.85$, $0.01 \leq b \leq 0.65$, $0.06 \leq c \leq 0.80$, $0<y<0.30$, $0 \leq x \leq 0.30$, $0 \leq z \leq 0.15$, and $a+b+c+y+x+z=1.00$;

where $Ln_{1-p} A_p Ni_{5-q} B_{q-s} D_s$ is $AB_5$-alloy(s) and can be single phase or multiphase; Ln is rare earth metal(s) including mischmetal; A is at least one element selected from the group consisting of Ti, Zr, Hf, Al, V, Nb, and Ca; B is at least one element selected from the group consisting of C, B, Al, Si, Cr, Mn, Fe, Co, Cu, Zn, Mo, W; D is at least one element selected from the group consisting of Mg, alkali metal(s), Ba, Sr, Pd, Ag, Sb, Bi, Y, Sc, Ta, 0, N, Sn and Te; and $0<p<0.5$, $0<q<2.4$, $0<s<0.6$;

where the aforementioned hydrogen storage electrode materials selected have the heats of hydride formation in a range of between −2.50 and −10.50 Kcal/mole H, preferably between −3.50 and −8.50 Kcal/mole H; and at least one of the heats of hydride formation of the aforementioned materials is in the range between −7.50 and −2.50 Kcal/mole H, preferably between −7.08 and −2.80) Kcal/mole H, and preferably, at least one of the hydrogen storage materials has a composition consisting of more than 40 at. % of nickel, further preferably more than 47 at. % of nickel. Also, the portion of each one of the hydrogen storage electrode materials is between 2 wt. % and 98 wt. % of the total of the hydrogen storage electrode materials; preferably, between 20 wt. % and 80 wt. %. Further preferably, the portion of each one of the hydrogen storage electrode materials is equal.

For a hydride electrode consisting of three, four or more hydrogen storage materials, the method used is similar to that mentioned above.

Specifically further, the negative electrode is composed of at least two hydrogen storage materials consisting of five or more elements, selected from the groups having compositions represented by:

$Ti_{a-a'} Zr_{a'} Mn_b V_{b-b'} Ni_c Mo_y Q_p M_x R_z$ and its hydride thereof, $Ti_{a-a'} Zr_{a'} Mn_b Nb_{b-b'} Ni_c Cr_y Mo_{y-y'} Q_p M_x R_z$ and its hydride thereof;

$Ti_{a-a'} Hf_{a'} Mn_b V_{b-b'} Ni_c Mo_y Q_p M_x R_z$ and its hydride thereof, $Ti_{a-a'} Zr_{a'} Mn_b V_{b-b'} Ni_c Cr_y Mo_{y-y'} Q_p M_x R_z$ and its hydride thereof;

Where Q is at least one element selected from the group consisting of Al, Nb, Ca, Si, Co, Fe, Cu, Zn, W, Pd, Ag, Nb and Sn; M is at least one element selected from the group consisting of Li, Na, K, Rb, Cs, Mg, P and S; R is at least one element selected from the group consisting of Hf, C, B, Sb, Bi, Sc, Y, Ta, Te, N, O, Ge, Ga and Mm, where Mm is mischmetal; and where the atomic mole ratios; a, b, c, p, x, v and z are defined by: $0.10<a<0.85$, $0<b<0.45$, $0.02<c<0.75$, $0<y<0.30$, $0<p<0.30$, $0 \leq x<0.15$, $0 \leq z<0.30$, $0<b+y<0.65$ and $a+b+c+p+x+y+z1.00$, $0<a' \leq a$, $0<b' \leq b$, $0<y' \leq y$; and if present, Mn is 0–15 at. %, Nb is 0–38 at. %, Mm is 0–8.0 at. % and O is 0–2.0 at. %, preferably $0.30<a<0.65$, $0.02<b<0.40$, $0.10<c<0.45$, $0<y<0.15$, $0<p<0.15$, $0 \leq x<0.15$, and $0<z<0.15$; another preferably, $0.40<a<0.65$, $0.02<b<0.40$, $0.10<c<0.45$, $0<x<0.15$, $0<y<0.15$ and $0<z<0.15$, $0<b+c<0.52$; futher preferably Zr is ledd than 30 at. %, and where the aforementioned two hydrogen storage electrode materials selected have the heats of hydride formation in a range of between −2.50 and −10.50 Kcal/mole H, preferably between −3.50 and −8.50 Kcal/mole H; and preferably, at least one of the hydrogen storage material has a composition consisting of more than 40 at. % of nickel, further preferably more than 47 at. % of nickel.

More specifically, a hydride negative electrode is composed of at least two hydrogen storage electrode alloys selected from one or the combination of the following groups;

$Ti_a Nb_b Ni_c R_x D_y Q_p$ $Ti_a Hf_b Ni_c R_x D_y Q_p$ $Ti_a Ta_b Ni_c R_x D_y Q_p$ $Ti_a V_b Ni_c R_x D_y Q_p$ and its hydride thereof, where R is at least one element selected from the group consisting of B, Hf, Sc, Zn, Sb, W, Sn, N, O, Te, Ge, Ga, P, S, and alkali metals; D is at least one element selected from the group consisting of Mn, Mg, Si, Cr, Fe, Co, Cu and rare earth metals; Q is at least one element selected from the group consisting of C, Ca, Sr, Ba, Al, Si, V, Zr, Nb, Mo, Pd, Ag, Y, Ta, La, Ce, and rare earth metals; and where the atomic mole ratios; a, b, c, x, y and p are defined by ; $0.10 \leq a \leq 0.85$, $0 \leq b \leq 0.5$, $0.06 \leq c \leq 0.80$, $0 \leq x \leq 0.30$, $0<y \leq 0.15$, $0 \leq p \leq 0.45$, and $a+b+c+x+y+p=1.00$; and where the aforementioned two hydrogen storage electrode materials selected have the heats of hydride formation in a range of between −2.85 and −10.50 Kcal/mole H, preferably between −3.85 and −8.50 Kcal/mole H; and at least one of the hydrogen storage material has a composition consisting of more than 40 at. % of nickel, preferably more than 47 at. % of nickel.

Several exemplary alloys related to the $Ti_aNb_bNi_cR_xD_yQ_p$ group of the present invention are;

$Ti_aNb_bNi_cHf_xCr_{y-y'}Mn_{y'}Q_p$,
$Ti_aNb_bNi_cSn_xCr_{y-y'}Mn_{y'}Q_p$,
$Ti_aNb_bNi_cR_xMn_yQ_{p-a'}Zr_{a'}$,
$Ti_aNb_bNi_cR_xCr_yQ_{p-a'}Zr_{a'}$,
$Ti_aNb_bNi_cHf_xCr_{y-y'}Mn_{y'}Q_{p-a'}Zr_{a'}$,
$Ti_aNb_bNi_cSn_xCr_{y-y'}Mn_{y'}Q_{p-a'}Zr_{a'}$,
$Ti_aNb_bNi_cR_xCr_yQ_{p-a'-b'}Zr_{a'}V_{b'}$,
$Ti_aNb_bNi_cR_xCr_yQ_{p-a'-b'}Zr_{a'}Cu_{b'}$,
$Ti_aNb_bNi_cR_xCr_yQ_{p-a'-b'}Zr_{a'}Al_{b'}$,
$Ti_aNb_bNi_cHf_xCr_{y-y'}Mn_{y'}Q_{p-a'-b'}Zr_{a'}Al_{b'}$,
$Ti_aNb_bNi_{c'1 B'x}Cr_{y-y'}Mn_{y'}Q_{p-a'-b'}Zr_{a'}Fe_{b'}$, and its hydride thereof; where R is at least one element selected from the group consisting of B, Hf, Sc, Zn, Sb, W, Sn, N, O, Te, Ge, Ga, P, S, and alkali metals; Q is at least one element selected from the group consisting of C, Ca, Sr, Ba, Al, Si, V, Cr, Mn, Fe, Co, Cu, Zr, Mo, Pd, Ag, Y, Ta, La, Ce, and Mm; and where the atomic mole ratios; a, a', b, c, x, y, y', and p are defined by ; a+b+c+x+y+p =1.00; 0.10≦a≦0.85, 0≦a'≦0.30, 0.001≦b≦0.50, 0≦b'≦0.30, 0.06≦c≦0.85, 0≦x≦0.30, 0≦y≦0.15, 0≦y'≦y, and 0≦p≦0.45; preferably, 0.15≦a≦0.63, 0.01≦b≦0.38, 0.15≦c≦0.60, 0<x≦0.15, 0≦y≦0.15 and 0≦p≦0.30, and where the aforementioned two hydrogen storage electrode materials selected have the heats of hydride formation in a range of between −2.85 and −10.15 Kcal/mole H, preferably between −3.85 and −8.50 Kcal/mole H; and preferably, at least one of the hydrogen storage material has a composition consisting of more than 40 at. % of nickel, further preferably more than 47 at. % of nickel.

Several exemplar alloys related to the $Ti_aHf_bNi_cR_xD_yQ_p$ group of the present invention are:

$Ti_aHf_bNi_cR_xMn_{y-y'}V_{y'}Q_p$,
$Ti_aHf_bNi_cR_xCr_{y-y'}V_{y'}Q_{p-a'}Zr_{a'}$,
$Ti_aHf_bNi_cR_xCu_yQ_{p-a'}Zr_{a'}$,
$Ti_aHf_bNi_cR_xMn_yQ_{p-a'}Zr_{a'}$,
$Ti_aHf_bNi_cR_xCu_{y-y'}Mn_{y'}Q_{p-a'}Zr_{a'}$,
$Ti_aHf_bNi_cR_xCr_{y-y'}Mm_{y'}Q_{p-a'}Zr_{a'}$,
$Ti_aHf_bNi_cR_xSi_yQ_{p-a'}Zr_{a'}$,
$Ti_aHf_bNi_cR_xSi_yQ_{p-a'Zr_{a'}}$,
$Ti_aHf_bNi_cR_xMm_yQ_{p-a'Zr_{a'}}$, and its hydride thereof; where R is at least one element selected from the group consisting of B, Hf, Sc, Zn, Sb, W, Sn, N, Te, O, Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm; and where the atomic mole ratios; a, a', b, c, x, y, y', and p are defined by: 0.10≦a≦0.85, 0≦a'≦0.30, 0≦b≦0.50, 0.02≦c≦0.85, 0≦x≦0.30, 0≦y≦0.30, 0≦y'≦y, 0≦p≦0.45, and a+b+c+x+y+p=1.00; preferably, 0.15≦a≦0.63, 0.01≦b≦0.38, 0.15≦c≦0.60, 0≦x≦0.15, 0≦y≦0.15 and 0≦y≦0.30.

Several exemplary alloys related to the $Ti_{a'}V_bNi_cR_xD_yQ_p$ group of the present invention are:

$Ti_{a'}V_bNi_cR_xCu_yQ_{p-a'}Zr_{a'}$,
$Ti_{a'}V_bNi_cR_xMn_yQ_{p-a'-b'}Zr_{a'}Mo_{b'}$,
$Ti_{a'}V_bNi_cR_xMn_{y-y'}Cr_{y'}Q_{p-a'}Zr_{a'}$, and its hydride thereof; where R is at least one element selected from the group consisting of B, Hf, Sc, Zn, Sb, W, Sn, N, O, Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Y, Ta, La, Ce, and Mm; and where the atomic mole ratios; a, a', b, b, c, x, y, y', and p are defined by: 0.10≦a≦0.85, 0≦a'≦0.30, 0≦b'≦0.30, 0≦b≦0.50, 0.02≦c≦0.85, 0≦x≦0.30, 0≦y'≦y, 0≦p≦0.45, and a+b+c+x+y+p=1.00; preferably, 0.15≦a≦0.63, 0.01≦b≦0.38, 0.15≦c≦0.60, 0≦x≦0.15, 0≦y≦0.15 and 0≦p≦0.30.

The making of a hydrogen storage electrode of this invention consists of the following steps:

(1) Selecting at least two compositions of hydrogen storage electrode materials of this invention.

(2) Preparing the ingot of said materials.

(3) Preparing the powder of said materials.

(4) Mixing the powder particles of said materials.

(5) Impregnating the powder mixture into a substrate current collector.

Each of the hydrogen storage electrode materials selected having compositions according to the present invention can be prepared first by mixing proper amounts of the elements or mixing elements with other commercially available master alloys such as nickel-zirconium, nickel-vanadium, ferronanadium, ferrotitanium, aluminum-vanadium, nickel-niobium, etc., and then melting them in a crucible selected from graphite, alumna, zirconia or water-cooled copper, in an induction or arc furnace under a protective atmosphere selected from inert gas (such as argon), hydrogen, nitrogen, hydrocarbon gas or a mixture thereof The homogeneous molten alloy is poured into a mold to obtain a solid ingot. The mold is made of a material similar to that of the crucible. The alloy ingot made thus can be crushed first by conventional methods such as a press, then the crushed pieces are pulverized to powder by hydriding/dehydriding cycles. The powder particles of two or more of hydrogen storage electrode materials of the present invention are then homogeneously mixed. The hydride negative electrode is then made by impregnating the powder mixture into a substrate current collector through a sintering or a pasting method with or without one or more powder binders selected from the group consisting of nickel, copper, aluminum, zinc, carbon black, inorganic or organic conductive polymer(s) such as polnihiophene, polyorthotoluidine, polyoctylthiophene, conductive adhesive(s), PTFE, CMC, PVA (polyvinyl alcohol), polyox, methylcellulose and hydroxylmethyl cellulose. The substrate current collector is selected from nickel, or nickel-plated steel or nickel-plated plastics mesh, sponge, foam, fabric, or perforated or expanded sheet, preferably nickel or nickel-plated sponge or nickel-plated fabric having 80–99% porosity. In the case of the sintering method, the dried powder of the two or more hydrogen storage electrode materials having typical sizes between 100 mesh to 400 mesh, with or without the aforementioned powder binders, is pressed with a pair of rollers onto the substrate to form the preliminary electrode which is then heated, under vacuum or a protective atmosphere such as argon, nitrogen, hydrocarbon gas, hydrogen or a mixture thereof at temperatures of from 200° to 1100° C. for 10 to 60 minutes; preferably, at temperatures from 450° to 950° C. for 10 to 20 minutes. In the case of the pasting method, the alloy powder having typical sizes between 100 mesh to 400 mesh is mixed with one or more of the aforementioned powder binders and pure water to make a paste or slurry.

Then the paste or slurry is pressed onto the substrate current collector by pasting, pressurizing, printing or doctor blade method. The resulting wet hydrogen storage hydride electrode is then dried at temperatures of from 60° to 300° C. for 20 to 90 minutes under vacuum or protective atmosphere selected from the group consisting of argon, nitrogen, hydrocarbon, hydrogen or the combination thereof. The electrode made is ready to be used as a negative electrode.

The battery, according to this invention, is composed of a container, a positive electrode, a negative electrode of this invention, a separator positioned between the positive and negative electrodes, and an electrolyte in the container and in contact with the positive and negative electrodes and the separator. Consequently, the hydride battery consisting of at least two hydrogen storage electrode materials and/or their hydrides is less sensitive to the oxygen and has low internal pressure during overcharge.

A suitable size of the negative electrode is cut to combine with a matching size of the metal oxide positive electrode having an electrochemical capacity of from 0.45 to 0.75 AH/cc. The N/P ratio, the electrochemical capacity ratio between the negative and positive electrodes, is between 1.0 to 2.0, preferably 1.10 to 1.45. The positive electrode active material comprises at least a metal oxide, preferably a nickel oxide plus 1–15 wt. % cobalt oxide. The substrate current collector is selected from nickel, or nickel-plated steel or nickel-plated plastics mesh, sponge, foam, fabric, or perforated or expanded sheet, preferably nickel or nickel-plated sponge or fabric having 80–99% porosity. To ensure high efficiency, –15 wt. % of fine conductive powder selected from the group consisting of nickel, copper, carbon, inorganic or organic conductive polymer such as polythiophene, polyorthotoluidine, polyoctylthiophene, zinc, hydride(s), oxide(s), and aluminum and combinations thereof, is added during the preparation of slurry, or paste of the positive electrode. The separator is cut of a similar size and is placed between the negative and positive electrodes to electrically separate them. The separator is composed of a porous body of insulator film or thin sheet of organic or inorganic material selected from the group consisting of polyamide (such as nylon), polypropylene, polyethylene, polysulfone, PVC. The thickness of separator is from 0.1mm to 2.00 mm, preferably from 0.20 mm to 0.50 mm. Finally, an electrolyte is added to complete an electrochemical cell. The electrolyte is composed of alkaline solution, preferably KOH solution with concentration from 20 to 40 wt. % plus 0 to 10 wt. % of LiOH. The container is made of either a metal such as nickel-plated steel or plastic material such as PVC, polypropylene, polysulfone and polyamide.

TABLE 1

| Alloy No. | Alloy Composition | $-H_h$ (Kcal/mole H) |
|---|---|---|
| 1 | $Ti_{0.13}Nb_{0.50}Ni_{0.17}Hf_{0.05}Cr_{0.09}Mn_{0.06}$ | 6.91 |
| 2 | $Ti_{0.41}Nb_{0.09}Ni_{0.40}Hf_{0.01}B_{0.03}Cu_{0.04}Mm_{0.02}$ | 6.23 |
| 3 | $Ti_{0.28}Nb_{0.12}Ni_{0.46}Zr_{0.03}Cr_{0.03}Mn_{0.04}Cu_{0.04}$ | 4.88 |
| 4 | $Ti_{0.13}Nb_{0.06}Ni_{0.50}Cr_{0.02}Mn_{0.02}Zr_{0.27}$ | 6.83 |
| 5 | $Ti_{0.33}Nb_{0.12}Ni_{0.46}Zr_{0.02}Cr_{0.03}Mn_{0.04}$ | 5.51 |
| 6 | $Ti_{0.20}Zr_{0.12}Ni_{0.41}V_{0.06}Cr_{0.06}Mm_{0.04}$ | 6.17 |
| 7 | $Ti_{0.08}Nb_{0.34}Ni_{0.30}Zn_{0.04}Cr_{0.02}Al_{0.02}Zr_{0.20}$ | 7.34 |
| 8 | $Ti_{0.22}Nb_{0.14}Ni_{0.39}B_{0.02}Cr_{0.05}Mn_{0.04}Zr_{0.14}$ | 6.49 |
| 9 | $Ti_{0.33}Nb_{0.12}Ni_{0.46}Zr_{0.02}Cr_{0.03}B_{0.04}$ | 5.32 |
| 10 | $Ti_{0.16}V_{0.32}Ni_{0.22}Hf_{0.03}Cr_{0.12}Mn_{0.04}Zr_{0.10}$ | 7.09 |
| 11 | $Ti_{0.26}Nb_{0.09}Ni_{0.40}Sb_{0.02}Cr_{0.06}Cu_{0.02}Zr_{0.15}$ | 7.09 |
| 12 | $Ti_{0.22}Nb_{0.07}Ni_{0.43}Sn_{0.02}Cr_{0.03}Al_{0.02}V_{0.04}Zr_{0.17}$ | 6.64 |
| 13 | $Ti_{0.27}Nb_{0.06}Ni_{0.40}Zn_{0.04}Mn_{0.04}Al_{0.01}Zr_{0.18}$ | 7.32 |
| 14 | $Ti_{0.11}Nb_{0.52}Ni_{0.18}W_{0.02}Cr_{0.13}Co_{0.02}Zr_{0.02}$ | 6.01 |

TABLE 1-continued

| Alloy No. | Alloy Composition | $-H_h$ (Kcal/mole H) |
|---|---|---|
| 15 | $Ti_{0.33}Zr_{0.02}Ni_{0.48}V_{0.12}Cr_{0.02}Cu_{0.03}$ | 5.19 |
| 16 | $Ti_{0.25}Zr_{0.15}Mn_{0.05}V_{0.08}Ni_{0.40}Mo_{0.03}B_{0.04}$ | 6.48 |
| 17 | $Ti_{0.25}Zr_{0.17}Mn_{0.06}V_{0.06}Ni_{0.40}Hf_{0.02}Cr_{0.03}$ | 7.42 |
| 18 | $Ti_{0.22}Nb_{0.20}Ni_{0.30}B_{0.06}Si_{0.02}Zr_{0.20}$ | 8.25 |
| 19 | $Ti_{0.14}Zr_{0.26}Ni_{0.10}Nb_{0.06}Cr_{0.02}Mn_{0.02}$ | 6.79 |
| 20 | $Ti_{0.50}Hf_{0.03}Ni_{0.35}Mn_{0.08}Cu_{0.04}$ | 7.87 |
| 21 | $Ti_{0.16}Zr_{0.10}Mn_{0.04}V_{0.32}Ni_{0.22}Hf_{0.04}Cr_{0.08}Al_{0.04}$ | 7.25 |
| 22 | $Ti_{0.25}Zr_{0.17}V_{0.08}Cr_{0.06}Ni_{0.39}Hf_{0.01}Zn_{0.04}$ | 7.30 |
| 23 | $Ti_{0.17}Zr_{0.20}Ni_{0.52}V_{0.04}Mn_{0.05}Mm_{0.02}$ | 5.97 |
| 24 | $Ti_{0.14}Zr_{0.25}Ni_{0.48}Nb_{0.06}Al_{0.05}Mn_{0.05}Mm_{0.02}$ | 7.04 |
| 25 | $Ti_{0.03}Hf_{0.01}Ni_{0.40}Nb_{0.07}Zr_{0.30}Mn_{0.15}Cu_{0.04}$ | 6.52 |
| 26 | $Ti_{0.20}Hf_{0.11}V_{0.06}Cr_{0.06}Ni_{0.41}Mn_{0.04}Zr_{0.12}$ | 7.25 |
| 27 | $Ti_{0.23}Hf_{0.01}V_{0.20}Ni_{0.43}Si_{0.03}Zr_{0.10}$ | 6.34 |
| 28 | $Ti_{0.40}Zr_{0.04}Ni_{0.44}Cu_{0.06}Mn_{0.01}Li_{0.02}$ | 6.28 |
| 29 | $Ti_{0.16}Zr_{0.12}Ni_{0.46}V_{0.22}Cr_{0.02}Co_{0.02}$ | 5.32 |
| 30 | $Ti_{0.10}Zr_{0.08}Hf_{0.08}Nb_{0.44}Ni_{0.20}Cr_{0.08}Al_{0.02}$ | 7.96 |
| 31 | $Ti_{0.22}Hf_{0.06}Ni_{0.39}Mo_{0.03}Cr_{0.04}Cu_{0.04}Zr_{0.18}$ | 8.12 |
| 32 | $Ti_{0.16}Hf_{0.06}Ni_{0.25}Nb_{0.26}Al_{0.05}Mn_{0.04}Zr_{0.18}$ | 8.84 |
| 33 | $Ti_{0.22}Zr_{0.17}V_{0.14}Cr_{0.03}Ni_{0.39}Mn_{0.05}$ | 6.98 |
| 34 | $Ti_{0.01}Zr_{0.20}V_{0.28}Cr_{0.02}Ni_{0.35}Mn_{0.07}$ | 6.54 |
| 35 | $Ti_{0.41}Nb_{0.12}Ni_{0.38}Hf_{0.02}Mn_{0.05}W_{0.02}$ | 6.85 |
| 36 | $Ti_{0.07}Zr_{0.03}Ni_{0.52}Co_{0.23}Mm_{0.12}Al_{0.03}$ | 3.07 |
| 37 | $Ti_{0.0}V_{0.53}Ni_{0.17}Cr_{0.16}Mn_{0.02}Nb_{0.02}$ | 5.37 |
| 38 | $Ti_{0.16}Ta_{0.12}Ni_{0.38}Al_{0.03}Cr_{0.04}Zr_{0.25}Fe_{0.02}$ | 7.75 |
| 39 | $Ti_{0.10}Zr_{0.20}Ni_{0.35}V_{0.28}Cr_{0.05}Mn_{0.02}$ | 6.80 |
| 40 | $Ti_{0.24}Zr_{0.17}Ni_{0.41}V_{0.10}Cr_{0.06}Mn_{0.02}$ | 6.96 |
| 41 | $Ti_{0.22}Zr_{0.20}Ni_{0.25}V_{0.27}Cr_{0.03}Mn_{0.03}$ | 8.71 |
| 42 | $Ti_{0.14}Zr_{0.13}Ni_{0.27}V_{0.33}Cr_{0.13}Mn_{0.04}$ | 6.73 |
| 43 | $Ti_{0.35}V_{0.10}Ni_{0.35}Hf_{0.04}Mm_{0.05}Mo_{0.05}Co_{0.06}$ | 7.11 |
| 44 | $Ti_{0.10}Zr_{0.20}Ni_{0.35}Nb_{0.28}Cr_{0.05}Mn_{0.02}$ | 7.08 |
| 45 | $Ti_{0.26}Zr_{0.16}Ni_{0.39}V_{0.09}Cr_{0.06}Mn_{0.04}$ | 7.07 |
| 46 | $Ti_{0.36}V_{0.15}Ni_{0.35}Hf_{0.04}Mn_{0.05}Mo_{0.05}$ | 6.75 |
| 47 | $Ti_{0.25}V_{0.13}Ni_{0.34}B_{0.04}Cr_{0.05}Zr_{0.16}Li_{0.03}$ | 7.71 |
| 48 | $Ti_{0.10}V_{0.03}Ni_{0.45}Cr_{0.03}Mn_{0.08}Zr_{0.29}Mm_{0.02}$ | 7.19 |
| 52 | $Ti_{0.16}Ta_{0.08}Ni_{0.36}Hf_{0.04}Nb_{0.30}Al_{0.04}Mo_{0.02}$ | 5.74 |
| 53 | $Ti_{0.17}Zr_{0.20}Mn_{0.08}V_{0.08}Ni_{0.40}Hf_{0.04}Al_{0.03}$ | 7.21 |
| 54 | $Ti_{0.20}V_{0.08}Ni_{0.40}B_{0.04}Mn_{0.07}Al_{0.03}Zr_{0.18}$ | 6.34 |
| 55 | $Ti_{0.25}V_{0.08}Ni_{0.43}Hf_{0.04}Mn_{0.10}Zr_{0.10}$ | 6.40 |
| 56 | $Ti_{0.26}Zr_{0.15}Hf_{0.02}Nb_{0.09}Ni_{0.40}Cr_{0.02}Mn_{0.06}$ | 7.39 |
| 57 | $Ti_{0.20}Cr_{0.15}V_{0.40}Ni_{0.20}Hf_{0.05}$ | 6.69 |
| 58 | $Ti_{0.10}Zr_{0.20}Cr_{0.02}Ni_{0.34}Hf_{0.01}V_{0.27}Mn_{0.05}Al_{0.01}$ | 6.80 |
| 59 | $Ti_{0.25}Zr_{0.17}Ni_{0.39}Nb_{0.08}Hf_{0.01}Cr_{0.06}Mn_{0.04}$ | 7.21 |
| 60 | $Ti_{0.20}Zr_{0.20}V_{0.08}Ni_{0.34}B_{0.04}Si_{0.04}Mm_{0.10}$ | 9.21 |

EXAMPLE 1

Table 1 lists some alloys having compositions according to the present invention. The hydrogen storage electrode materials are all have the heats of hydride formation in the range between –2.85 and –10.0 Kcal/mole H. To reduce the internal pressure of a hydride battery during overcharge, two or more compositions can be chosen, and at least one of the compositions consists of more than 40 at. % of nickel; and at least one of the heats of hydride formation of the alloys is in the range between –7.50 and –2.50 Kcal/mole H.

EXAMPLE 2

According to this invention, hydrogen storage electrode materials $Ti_{0.10}Zr_{0.28}Mn_{0.08}V_{0.03}Ni_{0.045}Hf_{0.01}Cr_{0.03}Mm_{0.02}$ (alloy 1), and $Ti0.08Zr_{0.20}V_{0.28}Cr_{0.02}Ni_{0.35}Mn_{0.07}$ (alloy 2) were made. A hydride electrode (electrode A) consisting of alloy 1 and alloy 2 in a 2:1 mole ratio was made by a sintering method. The substrate current collector was a nickel-plated steel fabric. A suitable AA-size of this negative electrode was cut. According to the present invention, a matching pasted nickel positive electrode and nylon separator were provided to make a rechargeable AA-size sealed nickel-hydride cell (cell A). The cell was charged to 1.50 V at 0.2 C-rate and discharged to 1.0 V. The capacity is up to 1445 mAH at a 0.60 A current. During 150% overcharge at 1.20 A current, the internal pressure is about 11 atm. For comparison, a similar AA-size nickel hydride cell (cell B) with 100% of alloy 2 as the active material of the negative electrode is made. During 150% overcharge at 1.20 A current, the internal pressure is about 24 atm. It is clear cell A has a much less internal pressure during overcharge.

EXAMPLE 3

According to this invention, hydrogen storage electrode materials $Ti_{0.26}Zr_{0.15}Hf_{0.02}Nb_{0.08}Ni_{0.43}Cr_{0.02}Mn_{0.04}$ (alloy 1), and $Ti_{0.08}Zr_{0.20}V_{0.28}Cr_{0.02}Ni_{0.35}Mn_{0.07}$ (alloy 2) were made. A hydride electrode (electrode A) consisting of alloy 2 and alloy 2 in a 1:1 mole ratio was made by a sintering method. The substrate current collector was a nickel-plated steel fabric. A suitable AA-size of this negative electrode was cut. According to the present invention, a matching pasted nickel positive electrode and nylon separator were provided to make a rechargeable AA-size sealed nickel-hydride cell (cell A). The cell was charged to 1.50 V at 0.2 C-rate and discharged to 1.0 V. The capacity is up to 1445 mAH at a 0.60 A current. During 150% overcharge at 1.20 A current, the internal pressure is about 10 atm. For comparison, a similar AA-size nickel hydride cell (cell B) with 100% of alloy 2 as the active material of the negative electrode is made. During 150% overcharge at 1.20 A current, the internal pressure is about 21 atm. It is clear that cell A has a much lower internal pressure during overcharge.

EXAMPLE 4

According to this invention, hydrogen storage electrode materials $Ti_{0.10}Zr_{0.28}Mn_{0.08}V_{0.03}Ni_{0.45}Hf_{0.01}Cr_{0.03}Mm_{0.02}$ (alloy 1), and $Ti_{0.11}Zr_{0.26}V_{0.01}Cr_{0.05}Ni_{0.35}Mn_{0.16}Co_{0.06}$ (Alloy 2) were made. A hydride electrode (electrode A) consisting of alloy 1 and alloy 2 in a 3:1 mole ratio was made by a sintering method. The substrate current collector was a nickel-plated steel fabric. A suitable AA-size of this negative electrode was cut. According to the present invention, a matching pasted nickel positive electrode and nylon separator were provided to make a rechargeable AA-size sealed nickel-hydride cell (cell A). The cell was charged to 1.50 V at 0.2 C-rate and discharged to 1.0 V. The capacity is up to 1445 mAH at a 0.60 A current. During 150% overcharge at 1.20 A current, the internal pressure is about 12 atm. For comparison, a similar AA-size nickel hydride cell (cell B) with 100% of alloy 2 as the active material of the negative electrode is made. During 150% overcharge at 1.20 A current, the internal pressure is about 24 atm. It is clear that cell A has a much lower internal pressure during overcharge.

EXAMPLE 5

According to this invention, hydrogen storage electrode materials $Mm\ Ni_{3.56}Mn_{0.40}Al_{0.32}Co_{0.72}$ (alloy 1) and $Ti_{0.10}Zr_{0.20}Mn_{0.05}V_{0.27}Ni_{0.34}Hf_{0.01}Cr_{0.02}Al_{0.01}$ (alloy 2) were made. A hydride electrode (electrode A) consisting of alloy 1 and alloy 2 in a 1:1 mole ratio was made by a sintering method. The substrate current collector was a nickel-plated steel fabric. A suitable AA-size of this negative electrode was cut. According to the present invention, a matching pasted nickel positive electrode and nylon separator were provided to make a rechargeable AA-size sealed nickelhydride cell (cell A). The cell was charged to 1.50 V at 0.2 C-rate and discharged to 1.0 V. The capacity is up to 1400 mAH at a 0.60 A current. During 150% overcharge at 1.20 A current, the internal pressure is about 12 atm. For comparison, a similar AA-size nickel hydride cell (cell B) with 100% of alloy 2 as the active material of the negative electrode is made. During 150% overcharge at 1.20 A current, the internal pressure is about 21 atm. It is clear that cell A has a much lower internal pressure during overcharge.

What is claimed is:

1. A method to make a hydride battery, said method comprises the preparation of a hydrogen storage electrode as a negative electrode; wherein steps of preparation of said electrode comprises; (1) selecting the compositions of hydrogen storage electrode materials, (2) preparing the ingot of said materials, (3) preparing the powder of said materials, (4) mixing the powder particles of said materials, and (5) impregnating the powder mixtures into a substrate current collector;

wherein said hydrogen storage electrode comprises two, three, four or more hydrogen storage materials; wherein at least one of said hydrogen storage materials is selected from the compositions represented by; $E_a.G_b.Ni_c.D_yM_xR_z$, and at least one of said materials is selected from the compositions represented by; $Ln_{1-p}A_pNi_{5-q}B_q$;

wherein $E_a.G_b.Ni_c.D_yM_xR_z$, the $AB_x$, or $AB_2$-type alloy(s), can be single phase or multiphase; and where Ni is the element nickel; E is one or more elements selected from the group consisting of: Ti Zr, Hf, Ca, and rare earth metals; G is at least one element selected from the group consisting of: Al, V, Mn, Nb, Hf, Ta, Si, Pd and Ag; D is at least one element selected from the group consisting of: Cr, Mn, Fe, Co, Cu, Zn, Mo, W and Sn; R is at least one element selected from the group consisting of: C, B, Mg, Al, Sb, Bi, Sc, Y, Hf, Ta, N, O, Te, Ge, and Ga; M is at least one element selected from the group consisting of Li, Na, K, Rb, Cs, P, and S; where a, b, c, x, and z are defined by: $0.10 \leq a \leq 0.85$, $0.01 \leq b \leq 0.65$, $0.06 \leq c \leq 0.80$, $0 < y \leq 0.30$, $0 \leq x \leq 0.30$, $0 \leq z \leq 0.15$, and $a+b+c+y+x+z=1.00$;

wherein $Ln_{1-p}A_pNi_{5-q}B_{q-s}D_s$, the $AR_5$-type alloy(s), can be single phase or multiphase; and where Ln is rare earth metal including mischmetal; A is at least one element selected from the group consisting of Ti, Zr, Hf, Al, V, Nb, and Ca; B is at least one element selected from the group consisting of C, B, Al, Si, Cr, Mn, Fe, Co, Cu, Zn, Mo, W, D is at least one element selected from the group consisting of Mg, alkali metal(s), Ba, Sr, Pd, Ag, Sb, Bi, Y, Sc, Ta, O, N, Sn and Te; and $0 \leq p < 0.5$, $0 < q < 2.4$, $0 \leq s < 0.6$;

wherein said hydrogen storage electrode materials have the heats of hydride formation in a range of between $-2.50$ and $-10.50$ Kcal/mole H, and at least one of said hydrogen storage electrode materials has the heat of hydride formation in the range between $-7.50$ and $-2.50$ Kcal/mole H; and wherein at least one of said hydrogen storage electrode materials consists of more than 40 at. % of nickel.

2. A method of claim 1, wherein the portion of each one of said hydrogen storage electrode materials is between 2 wt. % and 98 wt. % of the total of said hydrogen storage electrode materials.

3. A method of claim 1, wherein the portion of each one of said hydrogen storage materials is equal.

4. A hydride battery, wherein said battery comprises a container, a positive electrode, a hydrogen storage electrode as a negative electrode, a separator positioned between said positive and negative electrodes, and electrolyte in said container and in contact with said positive and negative electrodes and said separator;

wherein said hydrogen storage electrode comprises two, three, four or more hydrogen storage materials;

wherein at least one of said hydrogen storage materials is selected from the compositions represented by: $E_aG_bNi_cD_yM_xR_z$ and at least one of said materials is selected from the compositions represented by: $Ln_{1-p}A_pNi_{5-q}B_q$.

wherein $E_aG_bNi_cD_yM_xR_z$, the $AB_x$ or AB2-type alloy(s), can be single phase or multiphase; and where Ni is the element nickel; E is one or more elements selected from the group consisting of: Ti, Zr, Hf, Ca, and rare earth metals; G is at least one element selected from the group consisting of: Al, V, Mn, Nb, Hf, Ta, Si, Pd and Ag; D is at least one element selected from the group consisting of: Cr, Mn, Fe, Co, Cu, Zn, Mo, W and Sn; R is at least one element selected from the group consisting of: C, B, Mg, Al, Sb, Bi, Sc, Y, Hf, Ta, N, O, Te, Ge, and Ga; M is at least one element selected from the group consisting of Li, Na, K, Rb, Cs, P, and S; where a, b, c, x, y and z are defined by: $0.10 \leq a \leq 0.85$, $0.01 \leq b \leq 0.65$, $0.06 \leq c \leq 0.80$, $0 < y \leq 0.30$, $0 \leq x \leq 0.30$, $0 \leq z \leq 0.15$, and $a+b+c+y+x+z=1.00$;

wherein $Ln_{1-p}A_pNi_{5-q}B_{q-s}D_s$, the $AB_5$-type alloy(s), can be single phase or multiphase; and where Ln is rare earth metal including mischmetal; A is at least one element selected from the group consisting of Ti, Zr, Hf, Al, V, Nb, and Ca; B is at least one element selected from the group consisting of C, B, Al, Si, Cr, Mn, Fe, Co, Cu, Zn, Mo, W; D is at least one element selected from the group consisting of Mg, alkali metal(s), Ba, Sr, Pd, Ag, Sb, Bi, Y, Sc, Ta, O, N, Sn and Te; and $0 \leq p < 0.5$, $0 < q < 2.4$, $0 \leq s < 0.6$;

wherein said hydrogen storage electrode materials have the heats of hydride formation in a range of between $-2.50$ and $-10.50$ Kcal/mole H, and at least one of said hydrogen storage electrode materials has the heat of hydride formation in the range between $-2.50$ and $-7.5$ Kcal/mole H; and wherein at least one of said hydrogen storage electrode materials consists of more than 40 at. % of nickel.

5. A battery of claim 4, wherein the portion of each one of said hydrogen storage electrode materials is between 2 wt. % and 98 wt. % of the total of said hydrogen storage electrode materials.

6. A battery of claim 4, wherein the portion of each one of said hydrogen storage materials is equal.

7. A battery of claim 4, said battery is a sealed battery.

8. A battery of claim 4, said battery is a nickel hydride battery.

9. A battery of claim 4, wherein Ln is mischmetal, A is at least one element selected from the group consisting of Ti, Zr, Hf, Al, and Ca; B is at least one element selected from the group consisting of B, Al, Si, Cr, Mn, Fe, Co, Cu, Zn, Mo; D is at least one element selected from the group consisting of Mg, alkali metal(s), Ba, Sr, Pd, Sb, Bi, O, Sn.

10. A hydrogen storage electrode of claims 4.

11. A method to make a sealed rechargeable hydride battery, wherein said method includes the steps of: (1) preparing a hydrogen storage electrode as a negative electrode of said battery, (2) preparing a metal oxide electrode having an electrochemical capacity from 0.45 to 0.75 AH/cc as a positive electrode, (3) providing a separator selected from the group consisting of polyamide, polypropylene and polysulfone, (4) providing an electrolyte, (5) providing a container, and (6) assembling a rechargeable hydride battery, comprising the steps of: placing said separator between said negative and positive electrodes, placing said separator and said positive and negative electrodes in said container, and placing said electrolyte in said container in contact with said negative and positive electrodes and with said separator;

wherein said hydrogen storage electrode comprises two, three, four and more hydrogen storage material and/or the hydride thereof, said hydrogen storage materials are selected from compositions represented by $A_aB_bC_c$; where $A_aB_bC_c$ consists of 6–80 at. % of nickel and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, Ca, rare earth metals, B, Hf, Sc, Zn, Sb, W, Sn, N, O, Ge, Ga, the alkali metals, P, and S; the atomic mole ratios a, b, c, are defined by the heat of hydride formation, $H_h$;

wherein each of said hydrogen storage material has the heat of hydride formation, $H_h$, in a range of between $-2.50$ and $-10.50$ Kcal/mole H; where the heat of hydride formation, $H_h$, is defined by:

$$H_h = |aH_h(A)+bH_h(B)+cH_h(C)|/(a+b+c)+K,$$

where $H_h(A)$, $H_h(B)$, $H_h(C)$, are the heats of hydride formation of the elements A, B, C, in units of Kcal/mole H, respectively; where the heat of hydride formation of the elements in units of Kcal/mole H, is given as; $H_h(Mg)=-9.0$, $H_h(Ti)=-15.0$, $H_h(V)=-7.0$, $H_h(Cr)=-1.81$, $H_{h(Mn)}=-2.0$, $H_h(Fe)=4.0$, $H_h(Co)=3.5$, $H_h(Ni)=1.8$, $H_h(Al)=-1.38$, $H_h(Y)=-27$, $H_h(Zr)=-19.5$, $H_h(Nb)=-9.0$, $H_h(Pd)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, $H_h(\text{rare earth metals})=-27.0$, $H_h(Li)=-21.0$, $H_h(Na)=-13.4$, $H_h(K)=-13.7$, $H_h(Rb)=-12.5$, $H_h(B)=2.83$, $H_h(Sn)=2.05$, $H_h(Sb)=5.5$, $H_h(Hf)=-20.2$, $H_h(Sc)=-28.9$, $H_h(Zn)=-1.2$, $H_h(Ag)=1.0$, $H_h(S)=-1.0$, $H_h(N)=-0.5$, $H_h(W)=-0.50$, and $H_h(P)=-0.30$; where K is a constant having values of 0.5, $-0.2$, and $-1.5$ Kcal/mole H for $a+b+c$ equal to 2, 3, and 6 respectively, and having the value zero for $a+b+c$ not equal to 2, 3 and 6;

wherein at least one of said hydrogen storage material consists of more than 40 at. % of nickel, and at least one of said materials has a heat of hydride formation in a range between $-7.50$ and $-2.50$ Kcal/mole H.

12. A method of claim 1, wherein at least one of said hydrogen storage material consists of more than 47 at. % of nickel and at least one of said hydrogen storage electrode materials has a heat of hydride formation in a range between $-7.08$ and $-2.80$ Kcal/mole H.

13. A method of claim 1, wherein the portion of each one of said hydrogen storage electrode materials is between 2 wt. % and 98 wt. % of the total of said hydrogen storage electrode materials.

14. A method of claim 1, wherein said positive electrode is a nickel electrode.

15. A method of claim 1, wherein said hydrogen storage electrode materials are selected from the group consisting of $AB_x$, $AB_2$, $AB_5$-type alloys and combinations thereof.

16. A method of claim 1, wherein at least one of said positive and negative electrodes comprises conductive polymer(s).

17. A battery made in accordance with the method of claim 1.

18. A hydrogen storage electrode, said electrode comprises two, three, four and more hydrogen storage materials and/or the hydride thereof, said hydrogen storage materials are selected from compositions represented by $A_aB_bC_c$; where $A_aB_bC_c$ consists of 6–80 at. % of nickel and at least four other elements chosen from the group consisting of Mg, Ti, V, Cr, Mn, Fe, Co, Ni, Cu, Al, Y, Zr, Nb, Pd, Ag, Mo, Ca, Si, C, Cu, Ta, Ca, rare earth metals, B, Hf, Sc, Zn, Sb, W, Sn, N, O, Ge, Ga, the alkali metals, P, and S; the atomic mole ratios a, b, c, are defined by the heat of hydride formation, $H_h$;

wherein each of said hydrogen storage material has the heat of hydride formation, $H_h$, in a range of between −2.50 and −10.50 Kcal/mole H; where the heat of hydride formation, $H_h$, is defined by:

$$H_h = [aH_h(A) + bH_h(B) + cH_h(C)]/(a+b+c) + K ,$$

where $H_h(A)$, $H_h(B)$, $H_h(C)$, are the heats of hydride formation of the elements A, B, C, in units of Kcal/mole H, respectively; where the heat of hydride formation of the elements in units of Kcal/mole H. is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=3.5$, $H_h(Ni)=1.8$, $H_h(Al)=-1.38$, $H_h(Y)=-27$, $H_h(Zr)=-19.5$, $H_h(Nb)=-9.0$, $H_h(Pd)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, $H_h$(rare earth metals)$=-27.0$, $H_h(Li)=-21.0$, $H_h(Na)=-13.4$, $H_h(K)=-13.7$, $H_h(Rb)=-12.5$, $H_h(B)=2.83$, $H_h(Sn)=2.05$, $H_h(Sb)=5.5$, $H_h(Hf)=-20.2$, $H_h(Sc)=-28.9$, $H_h(Zn)=-1.2$, $H_h(Ag)=1.0$, $H_h(S)=-1.0$, $H_h(N)=-0.5$, $H_h(W)=-0.50$, and $H_h(P)=-0.30$; where K is a constant having values of 0.5, −0.2, and −1.5 Kcal/mole H for a+b+c equal to 2, 3, and 6 respectively, and having the value zero for a+b+c not equal to 2, 3 and 6;

wherein at least one of said hydrogen storage electrode materials comprises more than 47 at. % of nickel, and at least one of said hydrogen storage materials has a heat of hydride formation in a range between −7.50 and −2.50 Kcal/mole H.

19. A hydrogen storage electrode of claim 18, said electrode comprises conductive polymer(s).

20. A hydride battery, wherein said battery comprises a container, a positive electrode, a hydrogen storage electrode as a negative electrode, a separator positioned between said positive and negative electrodes, and electrolyte in said container and in contact with said positive and negative electrodes and said separator;

wherein said hydrogen storage electrode comprises two, three, four or more hydrogen storage electrode materials selected from the compositions represented by the formula:

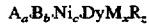

and the hydrides thereof, where Ni is the element nickel, A is at least one element selected from the group consisting of: Ti, Zr and Hf; B is at least one element selected from the group consisting of Al, V, Mn, Nb, Si, Pd and Ag; D is at least one element selected from the group consisting of: Cr, Mn, Fe, Co, Cu, Zn, Mo, W and Sn; R is at least one element selected from the group consisting of: C, B, Ca, Bi, Sb, Y, Sc, Hf, Ta, N, O, Te, Ge, Ga and Mm, where Mm is mischmetal; M is at least one element selected from the group consisting of Li, Na, K, Rb, Cs, Mg, P and S; and where the atomic mole ratios; a, b, c, x, y and z are defined by; $0.10<a<0.85$, $0.01<b<0.65$, $0.02<c<0.75$, $0<y<0.30$, $0\leq x \leq 0.15$, $0\leq z<0.30$, a+b+c+x+y+z=1.00; wherein at least one of said compositions consists of more than 40 at. % of nickel; and at least one of said hydrogen storage electrode materials has the heat of hydride formation in the range between −2.50 and −7.50 Kcal/mole H.

21. A hydrogen storage electrode of claim 20.

* * * * *